United States Patent [19]

Miller

[11] Patent Number: 6,136,058

[45] Date of Patent: *Oct. 24, 2000

[54] UNIFORMLY TACKY FILTER MEDIA

[75] Inventor: William R. Miller, Lancaster, Ohio

[73] Assignee: Superior Fibers, Inc., Bremen, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/178,324

[22] Filed: Oct. 23, 1998

Related U.S. Application Data

[62] Division of application No. 08/901,506, Jul. 28, 1997, Pat. No. 5,846,603.

[51] Int. Cl.[7] .......................... B01D 24/00; B01D 39/14; B01D 39/08; B01D 39/20; B01D 39/00
[52] U.S. Cl. .......................... 55/524; 55/527; 95/285; 210/506; 210/509; 252/88.2; 428/375; 428/378; 428/436
[58] Field of Search .................. 252/8.61, 8.84, 252/88.1, 88.2; 428/436, 375, 378; 210/509, 506; 55/421, 524, 512, 527; 95/285

[56] References Cited

U.S. PATENT DOCUMENTS

| | | |
|---|---|---|
| 2,597,201 | 5/1952 | Swiss et al. . |
| 2,732,356 | 1/1956 | Paxton . |
| 2,855,330 | 10/1958 | Griswold et al. ............ 427/244 |
| 3,084,089 | 4/1963 | Morgan et al. . |
| 3,133,884 | 5/1964 | Graham . |
| 3,484,405 | 12/1969 | Seto . |
| 3,658,578 | 4/1972 | Bennett . |
| 3,879,325 | 4/1975 | Frosberg ............ 260/29.4 UA |
| 3,896,073 | 7/1975 | Smith ............... 260/29.6 RW |
| 3,920,600 | 11/1975 | Ahramjian ............ 260/29.7 W |
| 3,945,975 | 3/1976 | Strack ............... 260/33.6 AQ |
| 4,269,747 | 5/1981 | Wada et al. ............ 260/27 BB |
| 4,348,455 | 9/1982 | Clayton . |
| 4,452,934 | 6/1984 | Swafford ................... 524/243 |
| 4,510,193 | 4/1985 | Blucher et al. . |
| 4,540,625 | 9/1985 | Sherwood . |
| 4,551,296 | 11/1985 | Kavesh et al. . |
| 4,612,221 | 9/1986 | Biet et al. . |
| 4,657,958 | 4/1987 | Fieldhouse et al. ............ 524/247 |
| 4,657,982 | 4/1987 | Breck et al. . |
| 4,680,330 | 7/1987 | Berrier et al. . |
| 4,748,051 | 5/1988 | Songer et al. ............ 427/213 |
| 4,762,751 | 8/1988 | Girgis et al. ............ 428/378 |
| 4,789,699 | 12/1988 | Kieffer et al. ............ 524/271 |
| 5,012,828 | 5/1991 | Hayes et al. . |
| 5,190,997 | 3/1993 | Lindemann et al. ............ 524/44 |
| 5,198,292 | 3/1993 | Lerner et al. ............ 427/389.9 |
| 5,340,651 | 8/1994 | Esu . |
| 5,378,755 | 1/1995 | Krishnan et al. ............ 524/555 |
| 5,520,997 | 5/1996 | Pourahmady et al. ............ 428/228 |
| 5,569,489 | 10/1996 | Kasmark, Jr. ............ 427/244 |
| 5,570,707 | 11/1996 | Hill . |
| 5,573,811 | 11/1996 | Townsley . |
| 5,578,371 | 11/1996 | Taylor et al. ............ 427/389.8 |
| 5,693,721 | 12/1997 | Hentges et al. ............ 525/339 |
| 5,804,254 | 9/1998 | Nedwick et al. ............ 427/389.8 |

OTHER PUBLICATIONS

Schlademan, James A., "Tackifiers and Their Effect on Adhesive Curing", pp. 24–26, Adhesives Age Sep. 1997.

Petrie, Edward M., "Handbook of Adhesives and Sealants", Chapter 9, pp. 319–341, McGraw Hill, 2000 (No month).

*Primary Examiner*—Diana Dudash
*Attorney, Agent, or Firm*—Frank H. Foster; Kremblas, Foster, Millard & Pollick

[57] ABSTRACT

A filter medium, a tackified binder composition and a method for providing a uniformly distributed tackifier on the glass fibers of an unwoven fiberglass web for improving filtration capacity and efficiency. An emulsified tackifier, such as polybutene, is mixed with a conventional binder composition and applied to the fibers before they are expanded into the web. The binder is cured in the conventional manner and the tackifier migrates to the surface on each fiber to enhance particle adsorption.

17 Claims, No Drawings

UNIFORMLY TACKY FILTER MEDIA

This is a division of application Ser. No. 08/901,506, filed Jul. 28, 1997, and now U.S. Pat. No. 5,846,603, granted Dec. 8, 1998.

TECHNICAL FIELD

This invention relates to the fabrication of fibrous webs bearing a tackifier for the adsorption of particulates, and more particularly relates to the fabrication of such fibrous webs for use as filter media in air filters.

BACKGROUND ART

Non-woven, fibrous webs have long been used to form filters for removing particulates from a fluid stream, particularly from air. Fibrous webs for filtration are typically fabricated by agglomerating randomly oriented fibers into a non-woven web. For some kinds of fibers, such as glass fibers, a binder is applied to the fibers so that the binder bonds the fibers at their intersections in order to hold the web together. For example, glass fibers are drawn from a molten mass of glass through a series of side by side extrusion orifices and then wound around a large rotating, cylindrical, metal drum. Binder is applied to the fibers either at a binder application station located between the orifices and the drum or the binder is applied to the fibers, such as by spraying, after they are wound on the drum. A typical prior art binder mixture comprises 65% urea formaldehyde and 35% water. After a sufficiently thick layer of fibers is wound around the drum, the layer of fibers is removed from the drum. The layer of fibers is subsequently blown, agitated, pulled or otherwise mechanically disturbed to assist in spreading the fibers apart and reorienting them into random entanglement to form a fibrous web or sheet material. The entire web and its binder is then dried and heated so that the binder is cured to bond the fibers where they intersect and contact each other.

Filter designers continuously seek to improve the particulate removal efficiency of filter media. One way to improve the efficiency of a filter is by providing a denser medium with smaller pores. However, the problem with this manner of improving efficiency is that it also increases the flow resistance, and therefore the pressure drop across the filter medium.

Another prior art method for enhancing the particulate removal efficiency of a fibrous filter is to spray a tackifier agent onto the filter medium after the non-woven fibrous web has been formed and the binder on the filter has been cured. For example, others in the prior art have sprayed oil, chlorinated paraffin, polybutene, phosphate esters, or other tackifier agents onto a filter medium web to promote the adhesion of particles and therefore improve filtration. However, because filters are designed to intercept particles entrained in air, the sprayed tackifier is concentrated near the surface of the filter medium and essentially non-existent in the interior. It is impossible to penetrate such a spray into the filter medium except by the use of excessive quantities of tackifier and at very high pressure. Furthermore, attempting to utilize such large quantities and high pressure makes the resulting product messy and difficult to handle. Consequently, this process is used only for high performance, relatively expensive filters, such as glass fiber bag filters for use in railroad diesel engines. Others have similarly applied tackifier agents to the surface of a filter medium web utilizing roll coating, but this provides even worse surface concentration.

The high concentration of tackifier on the surface of filter media as a consequence of rolling or spraying results in the accumulation during use of a very high concentration of adsorbed particles on the entrance side of the filter medium, causing such filters to become clogged more readily, quickly resulting in an increased pressure drop across the filter, and therefore reducing the service time of the filter.

Still others have immersed fibrous webs in a tackifier in order to deposit the tackifier on the fibers throughout the fibrous web. For example, filter media have been immersed in a polybutene which is diluted with a solvent. However, this process requires the removal of the solvent through some form of drying and recovery of the solvents in order to avoid pollution problems. An additional problem with the immersion approach is that the immersed filters, unless large quantities of solvents are used, apply a coating to the fibers which is excessively thick and messy.

Consequently, it is an object and feature of the present invention to provide a filter with a tacky fiber coating which is homogeneously distributed throughout the fibrous web filter medium, and to do so at an application rate which is easily controlled, and in a manner which avoids the use of solvents.

BRIEF DISCLOSURE OF INVENTION

In the present invention a mixture of a fiberglass binder and tackifier is applied to the fibers in the same manner, for example by spraying onto the fibers as they are wound around a drum, as binder alone has been conventionally applied. A polybutene tackifier may be formed into a water emulsion and then mixed with a urea formaldehyde emulsion binder which is conventionally used as a binder of glass fibers in the fiberglass industry for making webs, such as mats, sheets and fiberglass batting. After application of this mixture to the fibers, the fibers are formed into a fibrous web and the binder is cured to bind the fibers at their intersections. The result is a filter in which the tackifier has migrated to the surface of the fibers for improving the adsorption of particulates. The tackifier which is used must be immiscible with the binder so it can separate from the binder and migrate to the surface. The tackifier must also not vaporize during the heat cure of the binder so that it will remain in an effective amount and should not cross link with the binder during the heat cure so it maintains its tackiness.

In describing the preferred embodiment of the invention specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

A tackifying binder composition is prepared for application to glass fibers in the manner the prior art applies binder to the fibers prior to their expansion into a non-woven web. The composition both bonds the fibers after they are expanded into a non-woven, fibrous web and provides a tacky fiber surface.

The tackifying binder composition is formed by mixing water, a heat curable, polymeric binder composition, and an emulsified tackifier which is immiscible in the cured binder and has a sufficient fluidity to migrate to the surface of the binder. The binder should also be a sufficiently non-volatile and have a sufficiently high flash point that it will remain in an effective amount when the binder is cured and so that it will not present a combustion hazard. It also must not cross link with the tackifier at the curing temperature.

A binder composition which is common in the prior art and commercially available for bonding fiberglass fibers is a mixture of water and from 55%–67%, and preferably 61%–65% urea formaldehyde by weight, with the balance in water and other minor materials, such as emulsifiers, dyes, catalysts, glycol for moisture, and lubricant agents which are known in the prior art. The agglomerated mass of glass fibers carrying this binder is typically cured by exposure to oven temperatures on the order of 300°–600° F., and as a specific example a temperature of 540° F. for 1 second and 340° F. after. Another commonly used fiberglass binder is melamine formaldehyde, which would also be effective in practicing the present invention.

A tackifier which has been found to work effectively is polybutene having a molecular weight of 2500. Polybutene is commonly used as a plasticizer for a variety of resins and has also been used as a tackifier when mixed with polyethylene for making sheet material. Other polymers, particularly other polyolefins, exhibit tackifier properties. Generally, materials which have been used as plasticizers provide a class of materials which can be used as tackifiers, but a particular one must be selected which is immiscible in the binder so it will migrate to the surface of the binder, has a sufficiently high fluidity and a sufficiently low volatility at the binder curing temperature, and will not cross link with the binder.

The tackifier emulsion is preferably prepared for addition to the binder by blending water, an emulsifier and the tackifier to form a water emulsion of the tackifier. For a polybutene tackifier, depending upon the molecular weight of the polybutene which is used, it may be necessary to heat the mixture in order to emulsify the polybutene. For example, a polybutene having a molecular weight of 2500 should be heated to at least 70° C. to reduce its viscosity and break the polybutene into sufficiently small particles to accomplish emulsification. Preferably the proportion of water by weight in the tackifier emulsion is the same as the proportion of water by weight in the conventional binder mix. For example, if the binder comprises 65% emulsified urea formaldehyde binder composition and 35% water, the polybutene emulsion is formed with 35% water. This is done so that the addition of the tackifier emulsion does not change the water content of the binder-tackifier mixture.

In the preferred embodiment, the polybutene emulsion is added to comprise 2.4% of the binder-water-polybutene tackifier mixture. The binder-water-tackifier mixture is then applied to the glass fibers, such as by spraying, in the same manner as the binder composition alone is applied utilizing prior art techniques. The preferred application proportions provide a finished filter medium web having 1/10th of a gram of polybutene per square foot of filter medium, the filter medium having a weight of 10 grams per square foot.

After the tackifying binder composition is applied to the fibers, the fibers are then expanded according to conventional, prior art techniques into a fibrous web. One advantage of the present invention is that it permits usage of existing equipment without requiring any modification of the equipment or modification of its operation. The tackifying binder is subsequently heat cured also in the conventional manner for curing binder. Thus, only the composition applied by the conventional binder applicator is changed. The remainder of the entire manufacturing operation may otherwise remain unchanged.

After curing, a layer of a solid polymeric binder having a minor proportion of tackifier is coated upon each fiber because the tackifier is immiscible in the cured binder composition and has a sufficiently high fluidity (sufficiently low viscosity) to migrate to the surface.

Polybutene is available in polymers having a molecular weight ranging from 300 for those having a large fluidity (low viscosity) to those relatively viscous and solid polybutenes having a molecular weight of 6,000. Although polybutenes up to 4,000 may be used, we have found it preferable to utilize a polybutene having a molecular weight below 3000, and preferably of 2500.

When using the polybutene tackifier with a urea formaldehyde binder, the polybutene should comprise at least substantially 1% of the wet binder-tackifier mixture deposited on the fibers and no more than substantially about 20% of the wet binder-tackifier mixture. Preferably the polybutene is within a range of 1% to 10%, and 2–5% has been found quite effective and is preferred. Amounts of polybutene less than 0.5% have been found to provide an insufficiently tacky surface within a reasonable time for use of the fiberglass web as a filter. At amounts exceeding 20%, the binding characteristic of the binder is deleteriously affected.

An important advantage of the above invention is that it produces a fibrous web having a tackifier which is spread more uniformly over the surface of the fibers homogeneously throughout the entire web. This improves both the efficiency of the filter in removing particulate matter from a fluid such as air, and also improves the holding capacity of the filter. The tackifier is not confined to the surface of the fiberglass filter medium as it is when the tackifier is sprayed or rolled onto the surface and therefore entrapped particles are distributed more homogeneously throughout the entire filter.

A further advantage of the present invention is available when the web is formed utilizing a rotating drum in the manner described above. Because the drum creates a centrifugal force, the centrifugal force will cause some outward migration of the binder-tackifier mixture prior to curing. The result is that the tackifier may be applied with a concentration gradient through the entire web. This permits the filter medium to be oriented with its fluid entrance side having a slightly lesser concentration of tackifier in order to deter clogging of the inlet surface and a gradually increasing tackifier concentration progressively toward the outlet surface of the filter medium. An ordinary filter with no tackifier has a tendency to collect very few particles which are smaller than the spacing of the fibers because they pass through the interstitial passages. Those particles which are large enough to be entrapped in the filter, tend to be caught near the entrance side of the filter. Spraying or roll coating of tackifier onto one side of the medium, such as the entrance side causes particles to be collected in a layer on the tackified side. This relatively thin layer of concentrated particles clogs the filter raising the pressure drop across it. However, by providing a tackifier concentration gradient across the entire filter medium, the concentration gradient provides an opposite, off-setting effect, thus making the distribution of adsorbed particles more uniform throughout the filter medium than possible with non-tackified filters or conventionally tackified filters. The result is a filter with a more uniform distribution of adsorbed particles so that the filter is useable for a longer period of time.

Yet another advantage of the present invention is that it permits a more accurate control of the quantity, density or concentration of the tackifier on the fibers, much better than can be accomplished with spray or rolling. Control is accomplished simply by controlling the proportion of the tackifier in the binder and the customary control of the application rate.

The invention offers the further advantage that it is more worker friendly because cured tackifier-bearing, fiberglass webs release considerably less dust into the air during the manufacturing process than does a conventionally formed fiberglass web.

A further advantage is that the present invention eliminates the need for drying and for solvent recovery which is necessary when a fibrous filter medium is immersed in a dissolved tackifier or sprayed with a dissolved tackifier. Consequently, the filter is not only more effective as a filter and gives better filter performance, but it is cleaner for workers to work with and provides less risk to the environment.

A further advantage of the present invention was discovered from tests conducted on production equipment. Using present prior art processing, before the fibers are started on the drum, a layer of plastic film, such as that sold under the trademark Saran Wrap, is applied to the drum. This plastic wrap is tackified on the side nearest the drum surface and not tackified on the surface the fibers contact when they are wound around the drum. Before the fibers are started on the drum, the plastic wrap layer on the drum is sprayed with a mold oil so that the fiberglass mat, which is very sticky in the wet state, will not stick to the plastic wrap, making it easily removeable for further processing. After the fiberglass mat is spun on the drum, a layer of mold oil release agent is sprayed onto the glass fibers and binder resin, and another layer of polyethylene is applied to the mat. However, by using the polybutene tackifier in the binder in accordance with the present invention, the tackifier performs the function of a release agent because of its incompatibility with the polyethylene film. This allows elimination of the mold oil as a release agent which greatly reduces the pollution problems, slippery floors, and cost.

EXAMPLES

A tackifier emulsion was prepared. The equipment used in this preparation was a drill press, initially operated at its highest speed and using a laboratory, high-shear mixing blade, a stainless steel beaker, an electric cooking-type hot plate, a tongue depressor, and a thermometer showing temperature in degrees Centigrade. An amount of 340.5 grams of polybutene was used which is commercially sold under the trademark Poly SH 2500 by S & S Chemical Co., Inc. The emulsifier was used in an amount of 31.43 grams, and was an emulsifier sold under the trademark Iconol TBA-10-A-38 by BASF. Two amounts of very pure water, specifically water obtained by reverse osmosis, were used, the first-emulsification water in an amount of 103 grams and the second-dilution water in an amount of 97 grams. This produced a composition in an amount of 571.93 grams.

The polybutene, the emulsifier and the first emulsification water were mixed together with the tongue depressor in the stainless steel beaker, while bringing the temperature of the mixture up to 70° C. on the hot plate. The temperature was then maintained at 70° C. The mixer was turned on at full speed and operated for 30 minutes, while the beaker was rotated so all the material was removed from the sides and recirculated. The second dilution water was then metered slowly into the mixture over a 5 minute period after the completion of the 30 minute mix. This was done at the high speed of the drill press. Mixing was then slowed to a speed intermediate the highest speed and half speed for a period of 5 minutes. The mixer was then slowed down further to half speed and mixing continued for a further 5 minutes. Thereafter the mixture was turned off and withdrawn from the mixer and the mixture was then allowed to cool to room temperature. This tackifier emulsion was added to the binder mix as the last item to be added in the binder-tackifier mixture.

Multiple batches of polybutene emulsion were prepared in accordance with the foregoing description. Polybutene emulsion was mixed with a urea formaldehyde binder composition in the proportions shown in Examples I–III. Everything but the polybutene emulsion was mixed with water to make a 35% water, 65% remainder mixture and then the polybutene emulsion was added to that. However, the components can be added in any order.

Fiberglass webs were then manufactured using the above binder-tackifier composition utilizing conventional production equipment and in accordance with the conventional production process. The particular fiberglass webs were manufactured with a glass composition of 10 grams per square foot. A denser or thicker web would require proportionally more binder to maintain the same concentrations on the glass fibers. Fiberglass webs with each of the binder-tackifier compositions shown below in Examples I–III were then each cut into a filter-sized panel, approximately 20 inches by 20 inches, and visually inspected. All three looked like normal filtration media conventionally manufactured without the tackifier component.

Each of the three filter-sized panels were then subjected to a carbon black filtration test in which identical amounts of fine carbon particles were entrained in a flowing air stream and impinged upon each filter medium panel. A conventional filtration medium prepared with a composition which did not contain the polybutene emulsion, was also prepared. Visual observation revealed that the filter medium web of Example III retained twice the quantity of carbon black particles as retained by the conventional medium. Additionally, the filter medium of Example II held approximately 4 times as much carbon black particles as the medium of Example III.

EXAMPLE I

| | | |
|---|---|---|
| Urea formaldehyde (Plyamine) | 87.10% | 34.84 lbs. |
| emulsifier, dye, glycol, lubricant | 3.05% | 1.22 lbs. |
| water | 3.55% | 1.42 lbs. |
| Polybutene emulsion | 6.30% | 2.52 lbs. |
| Polybutene application rate to finished product: 0.26 grams/sq. ft. | | |

EXAMPLE II

| | | |
|---|---|---|
| Urea formaldehyde (Plyamine) | 83.95% | 33.58 lbs. |
| emulsifier, dye, glycol, lubricant | 3.05% | 1.22 lbs. |
| water | 3.55% | 1.42 lbs. |
| Polybutene emulsion | 9.45% | 3.78 lbs. |
| Polybutene application rate to finished product: 0.39 grams/sq. ft. | | |

EXAMPLE III

| | | |
|---|---|---|
| Urea formaldehyde (Plyamine) | 90.25% | 36.10 lbs. |
| emulsifier, dye, glycol, lubricant | 3.05% | 1.22 lbs. |
| water | 3.55% | 1.42 lbs. |
| Polybutene emulsion | 3.15% | 1.26 lbs. |
| Polybutene application rate to finished product: 0.13 grams/sq. ft. | | |

While certain preferred embodiments of the present invention have been disclosed in detail, it is to be understood that various modifications may be adopted without departing from the spirit of the invention or scope of the following claims.

What is claimed is:

1. A filter having a filter medium comprising a web of glass fibers having a tacky film exposed on the exterior of the fibers and distributed throughout the web, the filter medium comprising a fibrous web resulting from application to glass fibers, before forming the web, of a binder composition comprising a mixture of binder and a tackifier that cures to bond the fibers at their intersections and leaves an effective amount of the tacky film on the glass fibers to bind particulates in a fluid flowing through the web.

2. A filter in accordance with claim 1 wherein the tackifier is polybutene.

3. A filter in accordance with claim 2 wherein the polybutene has a molecular weight of substantially 2500.

4. A filter in accordance with claim 2 wherein the binder is urea formaldehyde.

5. A filter in accordance with claim 2 wherein the binder is melamine formaldehyde.

6. A filter in accordance with claim 1 or 2 or 3 or 4 or 5 wherein the proportion of tackifier is sufficient to provide a tacky surface on the fibers and less than an amount to destroy the effective binding characteristic of the binder.

7. A filter in accordance with claim 6 wherein the tackifier is substantially within the range of 1% to 20% by weight of the wet binder-tackifier mixture.

8. A filter in accordance with claim 7 wherein the tackifier is substantially within the range of 1% to 10% by weight of the cured binder-tackifier mixture.

9. A composition for bonding the fibers of a nonwoven, fibrous filter material and providing a tacky fiber surface, the composition comprising a mixture of:

(a) water;

(b) heat curable polymeric binder composition for bonding the fibers at their intersections; and (c) a tackifier which is immiscible in the binder, has sufficient fluidity to separate from the binder, and is sufficiently nonvolatile to remain in an effective amount to bind particulate matter in a fluid flowing through the filter material after curing and does not cross link with the binder when the binder is subjected to a binder curing temperature.

10. A composition in accordance with claim 9 wherein said binder comprises urea formaldehyde and said tackifier comprises polybutene.

11. A composition in accordance with claim 9 wherein said binder comprises melamine formaldehyde and said tackifier comprises polybutene.

12. A composition in accordance with claim 10 or 11 wherein the polybutene is added in an amount to comprise less than substantially 20% by weight of wet mixture of polymer binder and tackifier.

13. A composition in accordance with claim 12 wherein the polybutene is substantially in the range of 1% to 10% by weight of the wet mixture.

14. A composition in accordance with claim 13 wherein the polybutene is substantially 10% by weight of the wet mixture.

15. A composition in accordance with claim 14 wherein the polybutene has a molecular weight of substantially 2500.

16. A method for preparing a tackifying binder for bonding glass fibers into a nonwoven fibrous web, the method comprising:

(a) mixing water and urea formaldehyde to form a binder composition;

(b) preparing an emulsion of polybutene dispersed in water wherein the weight ratio of polybutene to water in the emulsion is substantially equal to the weight ratio of urea formaldehyde to water in the binder for maintaining the same proportion of water in the tackifying binder; and (c) mixing the emulsion with the binder composition to form a mixture.

17. A method in accordance with claim 16 wherein the method further comprises heating and stirring the mixture.

* * * * *